United States Patent [19]

Tateiwa

[11] Patent Number: 4,568,166
[45] Date of Patent: Feb. 4, 1986

[54] SAFETY DEVICE FOR AN AUTOMATIC FILM LOADING AND REWINDING DEVICE OF A CAMERA

[75] Inventor: Kimio Tateiwa, Chino, Japan

[73] Assignees: Fuji Photo Film Co., Ltd., Kanagawa; Nitto Kogaku K.K., Nagano, both of Japan

[21] Appl. No.: 558,116

[22] Filed: Dec. 5, 1983

[30] Foreign Application Priority Data

Dec. 9, 1982 [JP] Japan ................................. 57-216108

[51] Int. Cl.$^4$ ................................................ G03B 1/18
[52] U.S. Cl. ................................................ 354/214
[58] Field of Search .................... 354/173.1, 212, 213, 354/214, 215, 217, 218

[56] References Cited

U.S. PATENT DOCUMENTS 4,229,091 10/1980 Date et al. ........................... 354/214
4,371,244 2/1983 Daitoku et al. ..................... 354/214
4,379,629 4/1983 Daitoku ............................ 354/173.1
4,416,525 11/1983 Chan ................................... 354/214

Primary Examiner—Russell E. Adams
Attorney, Agent, or Firm—Brumbaugh, Graves, Donohue & Raymond

[57] ABSTRACT

A safety device for automatic film loading and rewinding device of a camera is provided with a load detecting member adapted to be actuated in response to a change in load from a film, the operation of the load detecting member being restrained during initial film blank feeding for automatic film loading.

3 Claims, 3 Drawing Figures

SAFETY DEVICE FOR AN AUTOMATIC FILM LOADING AND REWINDING DEVICE OF A CAMERA

This invention relates to a camera having an automatic film loading and rewinding device and more particularly, to a safety device for the automatic film loading device.

In cameras of this type, a film from its cartridge is automatically loaded and wound onto a film take-up spool driven by a drive system. When the film has been wound up completely, the operation of the drive system is reversed in response to a change in load transmitted from the film to the drive system to automatically rewind the film from the film take-up spool into the film cartridge. At the stage that the film is initially pulled out of the cartridge, the higher load due to curling of the film or the like may be imposed from the film on sprockets which are parts of the drive system and engage perforations in the film. The increased load may be as much as that imposed on the drive system upon the completion of the winding up of the film. In this case, the drive system is inconveniently switched over from the winding operation to the rewinding operation at the initiation of the film loading.

A main object of the present invention is to provide a safety device for an automatic film loading and rewinding device which is designed to eliminate the above-mentioned disadvantages.

Another object of the invention is to provide such a safety device wherein a load detecting member which is adapted to be actuated in response to a change in load from a film, is maintained in its inactive position during initial film blank feeding for automatic film loading.

The present invention will become more apparent from the following description on a preferred embodiment thereof shown in the accompanying drawings in which.

Figure 1:
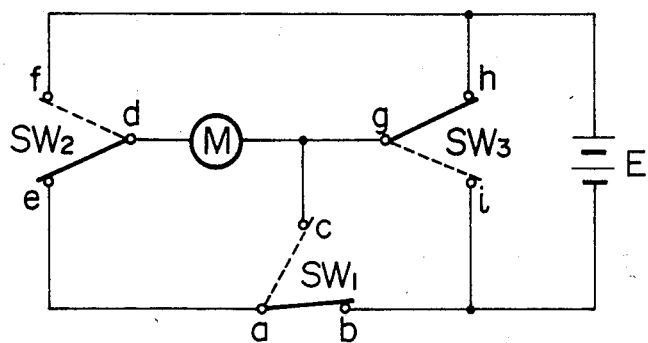
FIG. 1 is a schematic view of an electric circuit for automatic film winding and rewinding.

The principle of an automatic film loading and rewinding device will be described hereinafter with reference to FIG. 1 of the drawings. When switches $SW_1$, $SW_2$ and $SW_3$ are in their positions as shown in solid lines, an electric motor M is actuated to perform automatic loading operation of a film. The switch $SW_1$ is operated under control of a conventional shutter charging member 13 and an index cam 12 to bring a movable contact a into contact with either of fixed contacts b and c. Switch $SW_2$ is operated through a film feeding-load detecting member 1 to bring a movable contact d into contact with either of fixed contacts e and f. Switch $SW_3$ is operated through both of the film feeding-load detecting member 1 and a release to bring a movable contact g into contact with fixed contacts h and i. An electric source is indicated by E.

During the film loading, the movable contacts a, c, and g are in positions as shown in solid lines so that there is established an electric circuit through the motor M, and the contacts d, e, a, and b to actuate the motor M in a film winding direction for the film blank feeding.

When the automatic film loading is completed, the contact a of the switch $SW_1$ is switched over to the contact c to stop the actuation of the motor M. Thus, the film is ready for exposures. As the release is pushed down to make the exposure to the film, the contact g of the switch $SW_3$ is switched over to the contact i whereas when the release is returned to its original position, the contact g is switched over to the contact h. Thus, when an exposure to the film has been made and the contacts a and b are again electrically connected to each other, the motor M is actuated to perform the frame feeding of the film.

Upon completion of winding up of the film, the switches $SW_2$ and $SW_3$ are switched over between the contacts d and f and contacts g and i, respectively, so that current is passed through the circuit including the contacts f and d, motor M, contacts g and i and the electric source E to actuate the motor M in a film rewinding direction.

Figure 2:
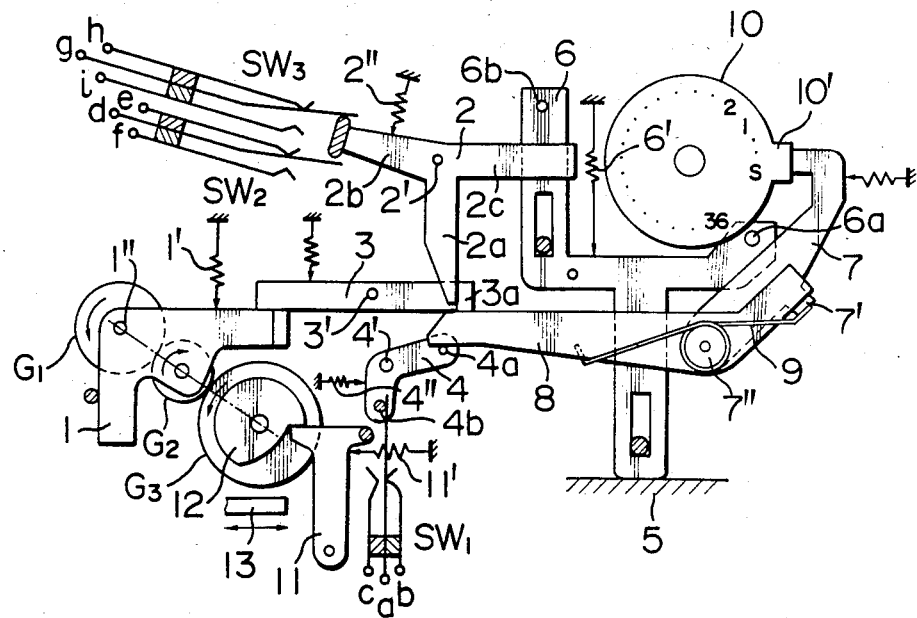
FIG. 2 is a schematic plan view of a safety device for automatic film loading of a camera according to the present invention but showing a position thereof for the film blank feeding.
Figure 3:
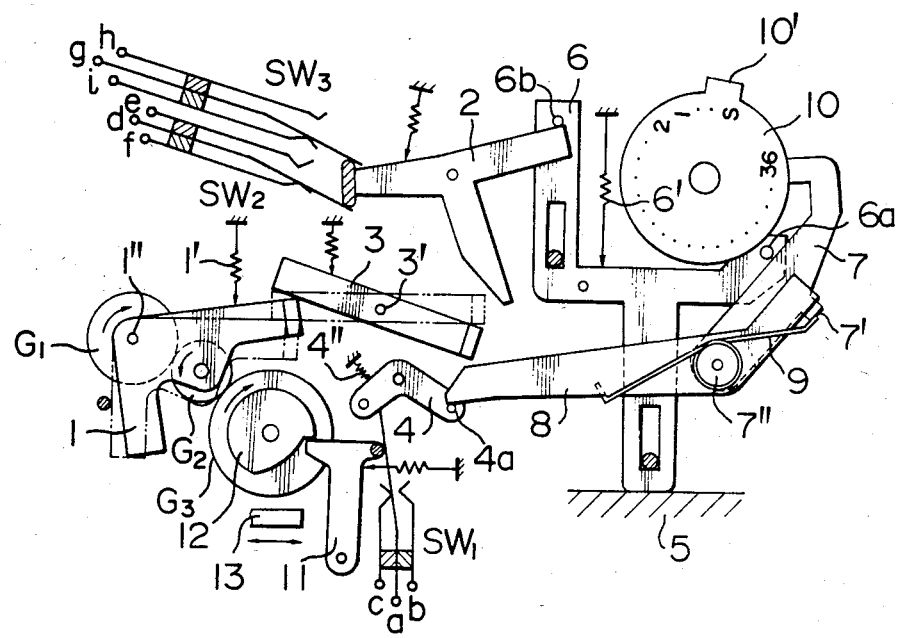
FIG. 3 is a view similar to FIG. 2, but showing a position of the safety device for film rewinding.

A preferred embodiment of the present invention will now be described in detail with reference to FIGS. 2 and 3 of the drawings. FIG. 2 shows a camera back 5 closed for an automatic film loading. A film blank feed detecting lever 7 is pivoted at its one end at 7" and the other end is adapted to cooperate with a cam portion 10' on a film counter 10. A control lever 8 is pivoted at the pivot pin 7" of the film blank feed detecting lever 7 and a spring 9 engages at its one end a projection 7' bent from the film blank feed detecting lever 7 and at the other end the control lever 8 at its lower edge to urge the levers 7 and 8 into abutment with each other at the location of the projection 7'. The spring 9 may be of enough strength to overcome a load imposed upon film blank feeding.

A load detecting lever 1 is pivotably mounted on a shaft 1" and the pivotal movement thereof about an axis of the shaft 1" is restrained by the control lever through an intermediate lever 3 pivoted at 3'. A lever 4 is provided to switch over a switch $SW_1$ and pivoted at 4'. A spring 4" acts on the lever 4 to bring pins 4a and 4b on the lever 4 into abutment with the control lever 8 and a movable contact a of the switch $SW_1$, respectively, which is brought into contact with a fixed contact b. The load detecting member 1 is provided with a sun gear $G_1$ forming a drive system driven by an electric motor M and a planetary gear $G_2$ meshed with the sun gear $G_1$. The planetary gear $G_2$ meshes with a driven gear $G_3$ to which an index cam 12 is connected through a one-way clutch (not shown). A spring 1' urges the load detecting member 1 about the axis of the shaft 1" in a clockwise direction to bring the planetary gear $G_2$ in the meshed relation with the gear $G_3$. An indexing lever 11 is urged toward the index cam 12 by means of a spring 11' and adapted to be operated against the action of the spring 11' by a shutter charging lever 13 which performs its returning movement upon operation of a release. A switching lever 2 has three arms 2a, 2b and 2c and is pivoted at 2'. A spring 2" urges the lever 2 about the pivot pin 2 counterclockwise to bring the arm 2a of the lever 2 into abutment with a lug 3a on the intermediate lever 3. The arm 2b of the lever 2 cooperates with movable contacts d and g of switches $SW_2$ and $SW_3$ to operate them. When the operation of the load detecting member 1 is restrained by the control lever 8, the arm 2b brings the movable contacts d and g into contact with fixed contacts e and h, respectively.

When during film blank feeding for the film automatic loading, an excess load due to curling of the film or the like is imposed on sprocket (not shown) which is associated with the gear $G_3$ of the drive system, the load detecting member 1 tends to rotate about the axis of the shaft 1″ due to revolution of the planetary gear $G_2$ round the sun gear G. However, this tendency is prevented by the control lever 8 restraining the position of the load detecting member 1 through the intermediate lever 3 so that the planetary gear $G_2$ remains meshed with the driven gear $G_3$ to continue performing the film blank feeding until the cam portion 10′ of the film counter 10 disengages from the film blank feed detecting lever 7.

As the film blank feed detecting lever 7 is released from the cam portion 10′, the levers 7 and 8 are pivotally moved about the pivot pin 7″ counterclockwise under the action of the spring 9 to release the restraint of the load detecting member 1. However, the load detecting member 1 is maintained in a position as shown in FIG. 2, under the action of the spring 1′. The counterclockwise pivotal movement of the lever 8 causes the switching lever 4 to rotate around the pivot pin 4′ clockwise, thereby moving the pin 4b away from the movable contact a of the switch $SW_1$. The movable contact a is switched over from the contact b to the contact c to stop the actuation of the motor M for completion of the automatic film loading.

The movable contact g is switched over to the fixed contact i every time the release is pushed down to make exposure to the film and the returning of the release causes the movable contact g to switch over to the fixed contact h. The shutter charging lever 13 returns toward the indexing lever 11 in association with the releasing operation. During its returning the shutter charging lever 13 pushes the indexing lever 11 against the action of the spring 11′ to rotate it around the pivot clockwise, thereby switching the movable contact a over to the fixed contact b while the returning of the release brings the movable contact g into contact with the fixed contact h to actuate the motor M, thereby rotating the gears of the drive system and the index cam 12. Actuation of the motor M is continued as long as the rotating index cam 12 keeps the indexing lever 11 pushed to maintain the contact a in contact with the fixed contact b so that the film is wound up by it one frame. When the indexing lever 11 encounters with the valley of the index cam 1 at the termination of its revolution, it is rotated around the pivot counterclockwise under the action of the spring 11 so that the movable contact a is switched over to the fixed contact c to stop the actuation of the motor M. In this way, the automatic film winding can be performed every time the exposure to the film is made.

The rotation of the driven gear $G_3$ is prevented at the termination of the film winding. As a result, the planetary gear $G_2$ which is being driven through the motor M, revolves round the sun gear $G_1$ counterclockwise to rotate the load detecting member 1 around the shaft 1″ counterclockwise against the action of the spring 1′. The rotation of the member 1 causes the intermediate lever 3 to rotate around the pivot pin 3′, thereby releasing the switching lever 2 from engagement of its arm 2a with the tub 3a on the lever 3. Then, the switching lever 3 is rotated around its pivot pin 2′ counterclockwise to switch the movable contacts d and g over to the fixed contacts f and i, respectively, thereby reversing the motor M for film rewinding (see FIG. 3).

Upon completion of the film rewinding and when the camera back is opened, an actuating lever 6 is pushed down under the action of a spring 6′ to rotate the levers 7 and 8 and the switching lever 2 about the axes of the pivot pins 7″ and 2′ clockwise through pins 6a and 6b on the actuating lever 6, respectively, thereby returning the lever 4, intermediate lever 3 and load detecting member 1 to their original position. Then, the film blank feed detecting lever 7 can ride at its end the cam portion 10′ and the switches $SW_2$ and $SW_3$ can be returned to their position as shown in FIG. 2.

It will be noted from the foregoing that the position of the load detecting member is restrained during the film blank feeding to prevent the planetary gear from operating for film rewinding whereby the film blank feeding can be positively performed for the automatic film loading without any returning of the film.

I claim:

1. A safety device for an automatic film loading and rewinding device of a camera adapted to be switched over from a film winding operation to a film rewinding operation upon completion of the film winding up, comprising a control lever movable between a position where film blank feeding is performed and a position where film frame feeding is performed, and a load detecting member adapted to be operated in response to a change in load from the film, the operation of said load detecting member being restrained by said control lever during the film blank feeding to prevent any rewinding operation of the film.

2. An automatic film loading and rewinding apparatus for a camera having a film blank feeding mode, a film frame feeding mode and a film rewinding mode comprising a film load detecting member which in one position conditions the apparatus for the film blank feeding and film frame feeding modes and in another position changes the apparatus to the film rewinding mode, actuatable safety control means which locks the load detecting member in the first position during the film blank feeding operation and after the film blank feeding operation is actuated to release the film load detecting member and change the apparatus to the frame feeding mode until an increase in film load indicating the end of the roll actuates the film load detecting member to said second position, and means for actuating the safety control means after the blank feeding operation.

3. An automatic film loading and rewinding apparatus as set forth in claim 2 including means for resetting the safety control means for a new roll of film.

* * * * *